(12) United States Patent
Ono et al.

(10) Patent No.: US 7,725,824 B2
(45) Date of Patent: May 25, 2010

(54) ACTION TRANSMISSION SYSTEM, TERMINAL APPARATUS, ACTION TRANSMISSION METHOD, AND ACTION TRANSMISSION PROGRAM

(75) Inventors: Masumi Ono, Tokyo (JP); Mikio Kamada, Kanagawa (JP)

(73) Assignee: Sony Corporation, Tokyo (JP)

( * ) Notice: Subject to any disclaimer, the term of this patent is extended or adjusted under 35 U.S.C. 154(b) by 1385 days.

(21) Appl. No.: 11/133,656

(22) Filed: May 19, 2005

(65) Prior Publication Data

US 2005/0289091 A1    Dec. 29, 2005

(30) Foreign Application Priority Data

Jun. 29, 2004    (JP)    ............................ P2004-191065

(51) Int. Cl.
| | |
|---|---|
| G06F 3/01 | (2006.01) |
| G06F 3/045 | (2006.01) |
| G06F 3/14 | (2006.01) |
| G06F 3/048 | (2006.01) |

(52) U.S. Cl. ........................ 715/702; 715/701; 715/810; 715/729

(58) Field of Classification Search ................. 715/701, 715/702, 708, 728, 729, 810
See application file for complete search history.

(56) References Cited

U.S. PATENT DOCUMENTS

2003/0078505 A1 *    4/2003    Kim et al. ................... 600/485

2005/0075586 A1 *    4/2005    Jamsen ........................ 600/595

FOREIGN PATENT DOCUMENTS

| EP | 0 875821 A2 | 11/1998 |
|---|---|---|
| JP | 60-181813 | 9/1985 |
| JP | 2000-049956 | 2/2000 |
| JP | 2002-232317 | 8/2002 |

* cited by examiner

Primary Examiner—Namitha Pillai
(74) Attorney, Agent, or Firm—K&L Gates LLP

(57) ABSTRACT

An action transmission system, terminal apparatus, action transmission method, and action transmission program are provided. The present invention provides an action transmission system including a first terminal apparatus for detecting a physical variation applied by a first user and a second terminal apparatus for outputting information to a second user as the physical variation. The first terminal apparatus transmits, to the second terminal apparatus, variation information indicative of a variation in physical quantity and intensity information subjectively set by the first user for the physical quantity by use of the physical variation applied by the first user. The second terminal apparatus receives the variation information and the intensity information from the first terminal apparatus, amplifies the received variation information by an amplification factor subjectively set by the second user to the intensity information, and outputs the amplified variation information as a physical variation.

17 Claims, 11 Drawing Sheets

FIG.3

| TAG INFORMATION | COMMUNICATION INFORMATION |
|---|---|
| AA | IMAGE |
| BB | TEXT AND SYMBOL |
| CC | VOICE AND SOUND |
| DD | INTENSITY INFORMATION/ VARIATION INFORMATION (ACCELERATION) |
| EE | INTENSITY INFORMATION/ VARIATION INFORMATION (PRESSURE) |

FIG.6

| INTENSITY | LEVEL [V] |
|---|---|
| LEVEL 1 | +5.6 |
| LEVEL 2 | +3.2 |

FIG.7

| INTENSITY | LEVEL [V] |
|---|---|
| LEVEL 1 | +4.2 |
| LEVEL 2 | +1.4 |

| INTENSITY INFORMATION | AMPLIFICATION FACTOR |
|---|---|
| INTENSE | 4.8 |
| MEDIUM | 2.5 |
| WEAK | 1.8 |

ACTION TRANSMISSION SYSTEM, TERMINAL APPARATUS, ACTION TRANSMISSION METHOD, AND ACTION TRANSMISSION PROGRAM

CROSS REFERENCES TO RELATED APPLICATIONS

This application claims priority to Japanese Patent Document No. 2004-191065, filed on Jun. 29, 2004 with the Japanese Patent Office, which disclosure in its entirety is hereby incorporated by reference.

BACKGROUND OF THE INVENTION

The present invention relates to an action transmission system, a terminal apparatus, an action transmission method, and an action transmission program and, more particularly, to an action transmission system, a terminal apparatus, an action transmission method, and an action transmission program that are capable of transmitting the intensity of action after adjusting the same so as to be adapted to the subjectivities of sender person and receiver person.

Telephone, electronic mail, and chat for example are known as means of communication executed by use of terminal apparatuses.

In the face-to-face communication not based on terminal apparatuses, not only meanings are transmitted through natural language, but also emotions and situations are transmitted through various means such as facial expression, bodily action, and feeling, for example.

In contrast, the communication based on terminal apparatuses is effective mainly in conveying meanings by natural language, but is difficult in conveying emotions, situations, and feelings that are not expressed by natural language, for example.

In the virtual communication practiced on the Internet, human-shaped computer synthesized images called avatars are used to simulate human feelings, but only in a limited, insufficient manner.

Currently, as described above, the communication based on terminal apparatuses is practiced but in a very restricted manner in terms of representing human feelings.

In an attempt to improve this situation, a communication apparatus is proposed in which the information about human feeling is detected, the detected action information is transmitted, and the transmitted information is received as vibration information or temperature information as provided in Japanese Patent Laid-open No. 2000-49956.

In the above-mentioned disclosed technology, physical quantities such as acceleration and temperature detected by a detection unit including an acceleration sensor and a thermistor arranged in a sender terminal apparatus are encoded. The encoded information is received by a receiver terminal apparatus for use in driving a vibrator and a temperature control device, thereby reproducing equivalent physical quantities.

However, the relationship between the physical quantities obtained from action information and the intention or subjectivity of each actor differs from person to person. In addition, the tactual sensations to vibration, pressure, and temperature differ from person to person.

For example, between a person having a high grip strength and a person having a low grip strength, there is generally a difference in grip strength value obtained when a mobile phone for example is normally held in the hand. Also, some persons feel a vibration strong while others feel it weak depending on the muscles, skins, and thickness of their hands.

The same holds with vibration and temperature. Consequently, in the communication based on terminal apparatuses for transmitting the physical quantities such as action information and temperature information for example, the intention or subjectivity of the sender may not be correctly transmitted to the receiver when an action for example detected by the sender is reproduced as an equivalent physical quantity.

It is desirable to transmit action information with intensity according to sender and receiver subjectively.

SUMMARY OF THE INVENTION

The present invention relates to an action transmission system, a terminal apparatus, an action transmission method, and an action transmission program and, more particularly, to an action transmission system, a terminal apparatus, an action transmission method, and an action transmission program that are capable of transmitting the intensity of action after adjusting the same so as to be adapted to the subjectivities of sender person and receiver person.

According to an embodiment of the present invention, there is provided an action transmission system including a first terminal apparatus for detecting a physical variation applied by a first user and a second terminal apparatus for outputting information to a second user as the physical variation. The first terminal apparatus transmits, to the second terminal apparatus, variation information indicative of a variation in physical quantity and intensity information subjectively set by the first user for the physical quantity by use of the physical variation applied by the first user. The second terminal apparatus receives the variation information and the intensity information from the first terminal apparatus, amplifies the received variation information by an amplification factor subjectively set by the second user to the intensity information, and outputs the amplified variation information as a physical variation.

According to an embodiment of the present invention, there is provided a terminal apparatus including: action detection means for detecting a predetermined variation in physical quantity caused by an action applied by a first user; intensity information acquisition means for acquiring intensity information corresponding to a magnitude of the detected variation in physical quantity; and transmission means for transmitting variation information indicative of the detected variation in physical quantity and the acquired intensity information.

According to an embodiment of the present invention, there is provided a terminal apparatus including: reception means for receiving variation information indicative of a variation in physical quantity based on an action applied by a second user to a second terminal apparatus and intensity information corresponding to a magnitude of the variation in physical quantity from the second terminal apparatus; amplification factor storage means for storing a correlation between intensity information and amplification factor; amplification factor acquisition means for acquiring an amplification factor corresponding to the received intensity information by use of the amplification factor storage means; output information generation means for generating output information by amplifying the received variation information by the acquired amplification factor; and output means for outputting the generated output information as a predetermined physical variation.

According to an embodiment of the present invention, there is provided an action transmission method for a computer having action detection step, intensity information acquisition step, and transmission step, including the steps of: detecting a predetermined variation in physical quantity caused by an action applied by a first user; acquiring intensity information corresponding to a magnitude of the detected variation in physical quantity; and transmitting variation information indicative of the detected variation in physical quantity and the acquired intensity information.

According to an embodiment of the present invention, there is provided an action transmission method for a computer having reception step, amplification factor storage step storing correlation between intensity information and amplification factor, amplification factor acquisition step, output information generation step, and output step, including: receiving variation information indicative of a variation in physical quantity based on an action applied by a second user to a second terminal apparatus and intensity information corresponding to a magnitude of the variation in physical quantity from the second terminal apparatus; acquiring an amplification factor corresponding to the received intensity information by use of the amplification factor storage step; generating output information by amplifying the received variation information by the acquired amplification factor; and output step for outputting the generated output information as a predetermined physical variation.

According to an embodiment of the present invention, there is provided an action transmission program for realizing, by use of a computer, including the steps of: detecting a predetermined variation in physical quantity caused by an action applied by a first user; acquiring intensity information corresponding to a magnitude of the detected variation in physical quantity; and transmitting variation information indicative of the detected variation in physical quantity and the acquired intensity information.

According to an embodiment of the present invention, there is provided an action transmission program for realizing, by use of a computer, including the steps of: receiving variation information indicative of a variation in physical quantity based on an action applied by a second user to a second terminal apparatus and intensity information corresponding to a magnitude of the variation in physical quantity from the second terminal apparatus; acquiring an amplification factor corresponding to the received intensity information by use of an amplification factor storage step storing a correlation between intensity information and amplification factor; generating output information by amplifying the received variation information by the acquired amplification factor; and outputting the generated output information as a predetermined physical variation.

According to an embodiment of the present invention, there is provided a terminal apparatus including: an action detection section for detecting a predetermined variation in physical quantity caused by an action applied by a first user; an intensity information acquisition section for acquiring intensity information corresponding to a magnitude of the detected variation in physical quantity; and a transmission section for transmitting variation information indicative of the detected variation in physical quantity and the acquired intensity information.

According to an embodiment of the present invention, the sender party is able to transmit action information with an intensity according to his own subjectivity and the receiver party is able to reproduce the received action information with an intensity according to his own subjectivity, thereby realizing operations of inputting/outputting action information suitable for personal characteristics.

Additional features and advantages of the present invention are described in, and will be apparent from, the following Detailed Description of the Invention and the figures.

BRIEF DESCRIPTION OF THE FIGURES

FIG. 3 is a diagram illustrating tag information.

FIG. 6 is a diagram illustrating an exemplary logical configuration of a "shake" action intensity decision table.

FIG. 7 is a diagram illustrating an exemplary logical configuration of a "grip" action intensity decision table.

DETAILED DESCRIPTION OF THE INVENTION

Figure 1:
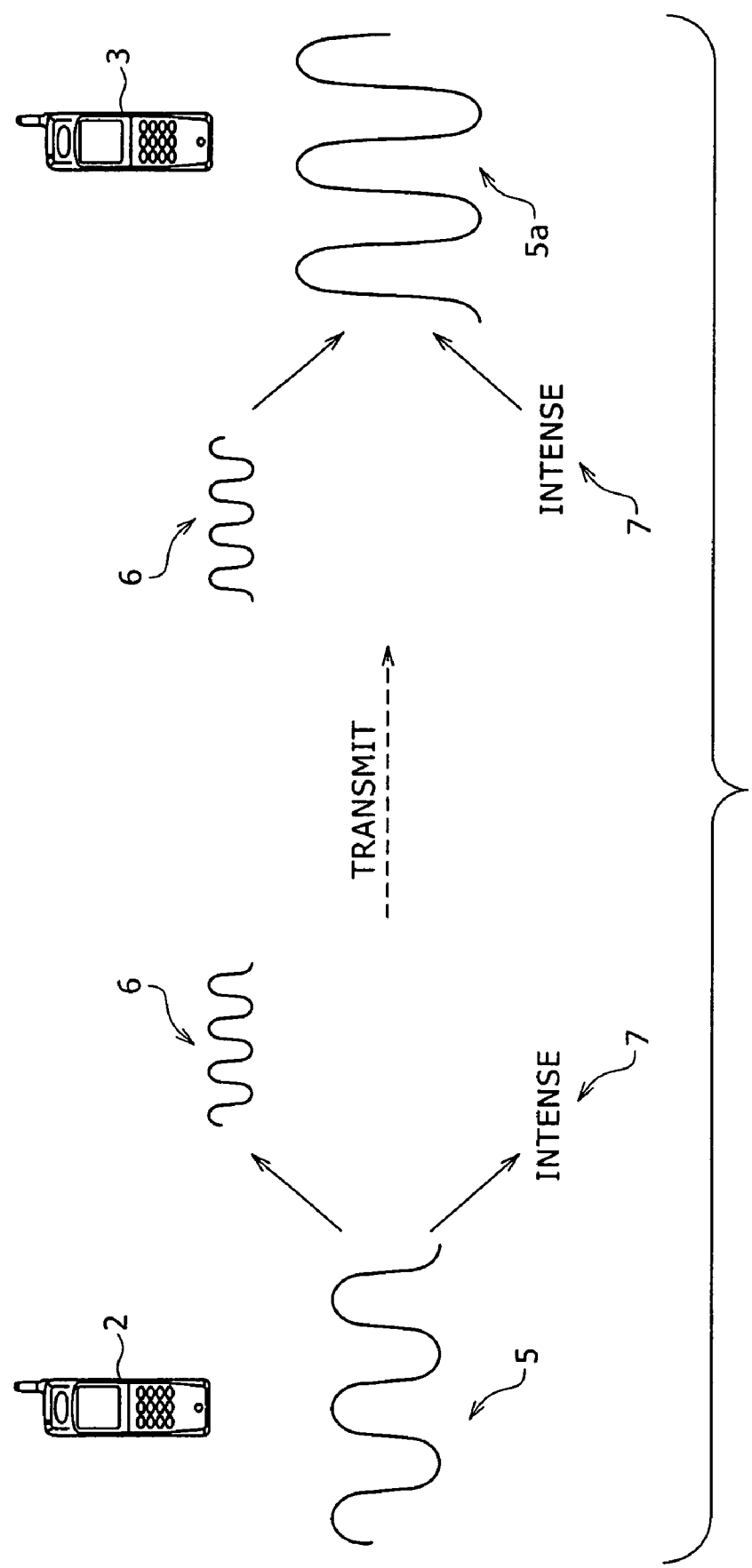
FIG. 1 is a schematic diagram illustrating the outline of one embodiment of the invention.

The present invention relates to an action transmission system, a terminal apparatus, an action transmission method, and an action transmission program and, more particularly, to an action transmission system, a terminal apparatus, an action transmission method, and an action transmission program that are capable of transmitting the intensity of action after adjusting the same so as to be adapted to the subjectivities of sender person and receiver person.

A sender party enters action information by shaking a mobile phone 2 for example, transmitting the action information to a mobile phone 3 of a receiver party. The receiver party receives the action information and vibrates the mobile phone 3 on the basis of the received information, sensing the operation entered by the sender party.

At this moment, because there is a difference between the subjectivity in the intensity of shaking the mobile phone 2 by the sender party and the subjectivity in the intensity felt by the receiver party on the mobile phone 3 thereof, the difference between both subjectivities is adjusted as follows.

First, for preparation, the sender party shakes the mobile phone 2 with three kinds of intensity; "high", "medium", and "low", thereby storing these intensities into the mobile phone 2 as an action intensity decision table.

In the same manner, the receiver party shakes the mobile phone 3 with three kinds of intensity; "high", "medium", and "low" that the receiver party feels so, to enter these intensities into the mobile phone 3, thereby storing the gains or amplification factors corresponding to these kinds of intensity as an output intensity setting table.

When the mobile phones of both the sender party and the receiver party have been set as described above, the sender party shakes the mobile phone 2.

The mobile phone 2 detects the time-dependent change of the acceleration of the mobile phone 2 by use of its cancellation sensor, for example, to get action information 5, thereby generating variation information 6 and intensity information 7 on the basis of acquired action information 5.

Variation information 6 is obtained by standardizing action information such that the maximum value of a variation of acceleration becomes a predetermined standard reference value and represents the time-dependent information of a vibration (or a physical variation) applied to the mobile phone 2 as a relative value for the standard reference value. For the standard reference value, the maximum output of the vibrator in the mobile phone 3 may be used, for example.

In intensity information 7, the magnitude of displacement of the mobile phone 2 is related to one of "high", "medium", and "low" by use of the action intensity table registered as described above.

Thus, the mobile phone 2 is capable of dividing the action information into variation information consisting of relative values of user's action and intensity information that is highly influenced by user's subjectivity. Consequently, the action information highly influenced by subjectivity may be processed independently.

Having generated variation information 6 obtained by standardizing action information 5 as described above and intensity information 7 indicative of a subjective value of the sender party for the action information, the mobile phone 2 of the sender party transmits these pieces of information to the mobile phone 3 of the receiver party.

Having received variation information 6 and intensity information 7 from the mobile phone 2 of the sender party, the mobile phone 3 of the receiver party references the output intensity setting table to get an amplification factor corresponding to received intensity information 7, thereby amplifying received variation information 6 by this amplification factor to output information. On the basis of this output information, the mobile phone 3 drives its vibrator to transmit a vibration to the receiver party.

Thus, the sender party is capable of transmitting a waveform (or variation information 6) caused by the shaking of the mobile phone 2 and the subjective intensity indicative of whether the mobile phone 2 has been shaken with low, medium, or high intensity. In response, the mobile phone 3 is capable of reproducing the waveform received from the mobile phone 2 of the sender party with the subjective intensity of the receiver party corresponding to the subjectivity of the sender party.

It should be noted that, in the above-mentioned example, a variation in physical quantity is given to the mobile phone 2 by vibration; alternatively, another physical quantity such as pressure (the pressure of holding the mobile phone 2 by the hand of the sender party) or temperature may be used, for example.

Also, the mobile phone 3 is capable of reproducing an action of the sender party by another physical quantity such as pressure or temperature instead of vibration, for example.

It would be also practicable for the mobile phone 2 to enter an action by pressure and for the mobile phone 3 to reproduce the input by vibration, for example; namely, would be practicable that there is a difference between a physical quantity entered in the mobile phone 2 and a physical quantity reproduced in the mobile phone 3.

Figure 2:
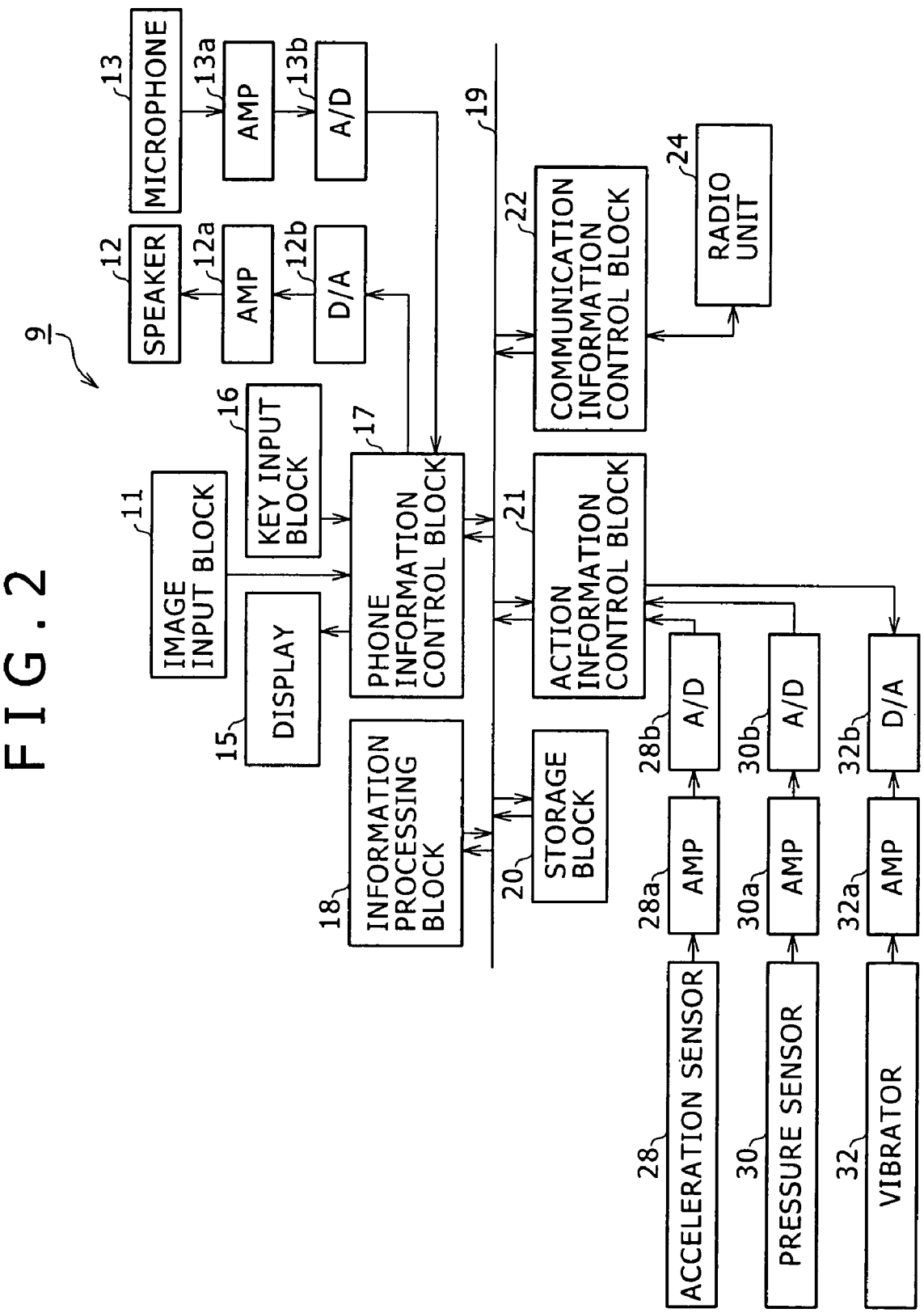
FIG. 2 is a block diagram illustrating an exemplary functional configuration of a mobile phone for use in one embodiment of the invention.

FIG. 2 is a block diagram illustrating a functional configuration of a mobile phone for use in inputting/outputting action information in the present embodiment.

In the present embodiment, a mobile phone is used as a terminal apparatus for inputting/outputting action information for one example; alternatively a mobile terminal such as a PDA (Personal Digital Assistant), a personal computer, or a game machine that is network-connectable may be used as a terminal apparatus in the present embodiment.

As shown in the figure, a mobile phone 9 is an information processing apparatus based on an information processing block 18, a storage block 20, a phone information control block 17, an action information control block 21, and a communication control block 22 that are interconnected by a bus line 19.

The phone information control block 17 controls information input/output operations such as phone call, electronic mail transmission/reception, image (still or moving) transmission/reception so as to make the most of the normal mobile phone capabilities by the mobile phone 9.

The phone information control block 17 is connected with an image input block 11, a key input block 16, and a microphone 13 for example as input means.

The image input block 11 is based on a lens for imaging a photographic subject, a CCD (Charge Coupled Device) for converting a formed image into an electrical signal, and an image sensor such as CMOS (Complementary Metal Oxide Semiconductor), for example.

The user is able to direct the image input block 11 to a photographic subject to take a still image or a moving image thereof.

The key input block 16 has keys for entering numerals, letters, and symbols. Pressing these keys, the user is able to enter numerals, letters, and symbols to create electronic mail or enter commands into the system of the mobile phone 9.

The microphone 13 picks up voice and outputs the voice as an analog signal. The voice detected by the microphone 13 is amplified by an AMP (amplifier) 13$a$, the amplified analog signal is converted into a digital signal, and the resultant digital signal is inputted in the phone information control block 17.

The user is able to enter voice information and sound information through the microphone 13.

In addition, the phone information control block 17 is connected with a display 15 and a loudspeaker 12 as output means.

The display 15 is based on a display device such as a liquid crystal display (LED) for example, showing letter and symbol information and images.

The user is able to display the electronic mail or images received from the sender party onto the display 15 for making a confirmation thereof.

The loudspeaker 12 vibrates the air with an analog voice signal to sound voice or sound.

Because a voice signal is received as a digital signal, the voice signal is converted by a D/A converter 12$b$ into an analog signal, the converted analog signal is amplified by an AMP 12$a$, and the amplified signal is inputted in the loudspeaker 12.

The user is able to make a confirmation of the voice or sound received from the sender party by the voice sounded from the loudspeaker 12.

The action information control block 21 controls the input/output operations of action information.

When action information is inputted, the user acts on the mobile phone 9 and a resultant variation in physical quantity occurring on the mobile phone 9 is detected. In the present embodiment, acceleration and pressure are used as exemplary physical quantities.

When action information is outputted, the action information received from the mobile phone of the sender party is used to cause a physical variation on the mobile phone 9 and this physical variation is outputted. In the present embodiment, a vibrator is used to cause a physical variation on the mobile phone 9.

The action information control block 21 is connected with an acceleration sensor 28 and a pressure sensor 30 as input means.

The acceleration sensor 28, arranged inside or outside of the mobile phone 9, detects the acceleration of the mobile phone 9 and outputs the detected acceleration as an analog signal. The acceleration to be detected may be any of spatial three-dimensional acceleration components.

The acceleration sensor 28 may be a sensor based on strain gage, load cell, electrical capacitance, or diaphragm.

An acceleration signal detected by the acceleration sensor 28 is amplified by an AMP 28a, the amplified acceleration signal is converted by an A/D converter 28b into a digital signal, and the digital signal is inputted in the action information control block 21.

It should be noted that it is also practicable to filter the output of the acceleration sensor 28 with a bandpass filter, not shown.

The acceleration sensor 28 detects an acceleration that is generated when the user shakes the mobile phone 9 according to user's sensitivity after pressing a predetermined key according to a command shown on the display 15 and then presses a predetermined key according to a command shown on the display 15, for example.

The pressure sensor 30, arranged on one side of the mobile phone 9 for example, detects a pressure of the holding of the mobile phone 9 by the user's hand and outputs the detected pressure as an analog signal.

The pressure detected by the pressure sensor 30 is amplified by an AMP 32a, and the amplified signal is converted by an A/D converter 30b into a digital signal, which is inputted in the action information control block 21.

It should be noted that the output of the pressure sensor 30 may be filtered by a bandpass filter, not shown.

The pressure sensor 30 is also used in a manner in which the user presses a predetermined key, grips the mobile phone 9, and then ends this sequence by pressing a predetermined key. Time dependent information of the pressure during this sequence is used as action information.

The action information control block 21 is connected with a vibrator 32 as output means.

The vibrator 32 is a device for generating vibration to vibrate the mobile phone 9 in accordance with a drive signal formed by an analog signal.

The vibrator 32 may be formed by a vibration motor, a piezoelectric element, a giantmagnetostrictive device, or a solenoid device, for example.

The vibration motor herein denotes a device that generates vibration by attaching a weight on the motor shaft in an eccentric manner and rotating the motor shaft.

A drive signal of the vibrator 32 is outputted from the action information control block 21 as a digital signal, this digital signal is converted by a D/A converter 32b into an analog signal, and this analog signal is amplified by the AMP 32a to be inputted in the vibrator 32.

On the basis of the acceleration or the pressure detected on the mobile phone of the sender party, the vibrator 32 outputs vibration and the receiver party senses the vibration of the mobile phone 9 to get the feeling of the sender party.

The communication control block 22 controls radio communication with a base station via a radio unit 24.

The radio unit 24 has an antenna and transmits a signal outputted from the communication control block 22 to the base station in a wireless manner and receives a signal from the base station to output the received signal to the communication control block 22.

The base station is arranged such that the base station is connectable with a network such as the Internet or a communication line such as a public switched line.

The storage block 20 stores programs and data and is constituted by a storage device such as EEPROM (Electrically Erasable And Programmable ROM), for example.

The storage block 20 may be accessed by the information processing block 18 for writing or deleting programs and data and retains the storage contents after the power to the mobile phone 9 is turned off.

Programs stored in the storage block 20 include an OS (Operating System) that is the basic program for controlling the mobile phone 9 in its entirety and an action transmission program. The action transmission program generates variation information and intensity information from the action information entered by the user or generates a drive signal for driving the vibrator 32 from variation information and intensity information received from the sender party, for example, which will be described later.

The data stored in the storage block 20 includes an action intensity decision table and an output intensity setting table, for example, which will be described later.

The information processing block 18 executes various computation processing operations and the system control of the mobile phone 9 in its entirety in accordance with predetermined programs.

The information processing block 18 is based on a CPU (Central Processing Unit), a ROM (Read Only Memory), and a RAM (Random Access Memory), for example.

The information processing block 18 uses 2-byte code tag information as shown in FIG. 3 for the identification of the type of information to be transmitted or received with the mobile phone of the other party.

For example, in the case of image information, tag information "AA is added thereto or in the case of letter or symbol information, tag information "BB" is added thereto.

In the case of voice or sound information, tag information "CC" is added thereto.

In the case of intensity information and variation information generated by the acceleration sensor, tag information "DD" is added thereto or in the case of intensity information and variation information, tag information "EE" is added thereto.

Referring to FIG. 2 again, in transmitting information from the communication control block 22, the information processing block 18 encodes the information and attaches the tag information to the encoded information, thereby allowing the mobile phone of the other party to identify the type of the information.

Having received information from the mobile phone of the other party, the information processing block 18 separates and decodes the received information by use of the tag information thereof and transmits the decoded information to the phone information control block 17 or the action information control block 21 depending on the type of the information.

Then, the information transmitted to the phone information control block 17 or the action information control block 21 is outputted to the display 15, the loudspeaker 12, and the vibrator 32 to drive these devices.

It should be noted that the mobile phone of the other party has the same configuration as that of the mobile phone 9.

The configuration of the mobile phone 9 is as described above. The acceleration sensor 28 and the pressure sensor 30 have each an action detection means for detecting the variation in a predetermined physical quantity (acceleration or pressure).

Operating with the communication control block 22 and the radio unit 24, the information processing block 18 has sender means and receiver means for transmitting and receiving variation information and intensity information.

Figure 4:
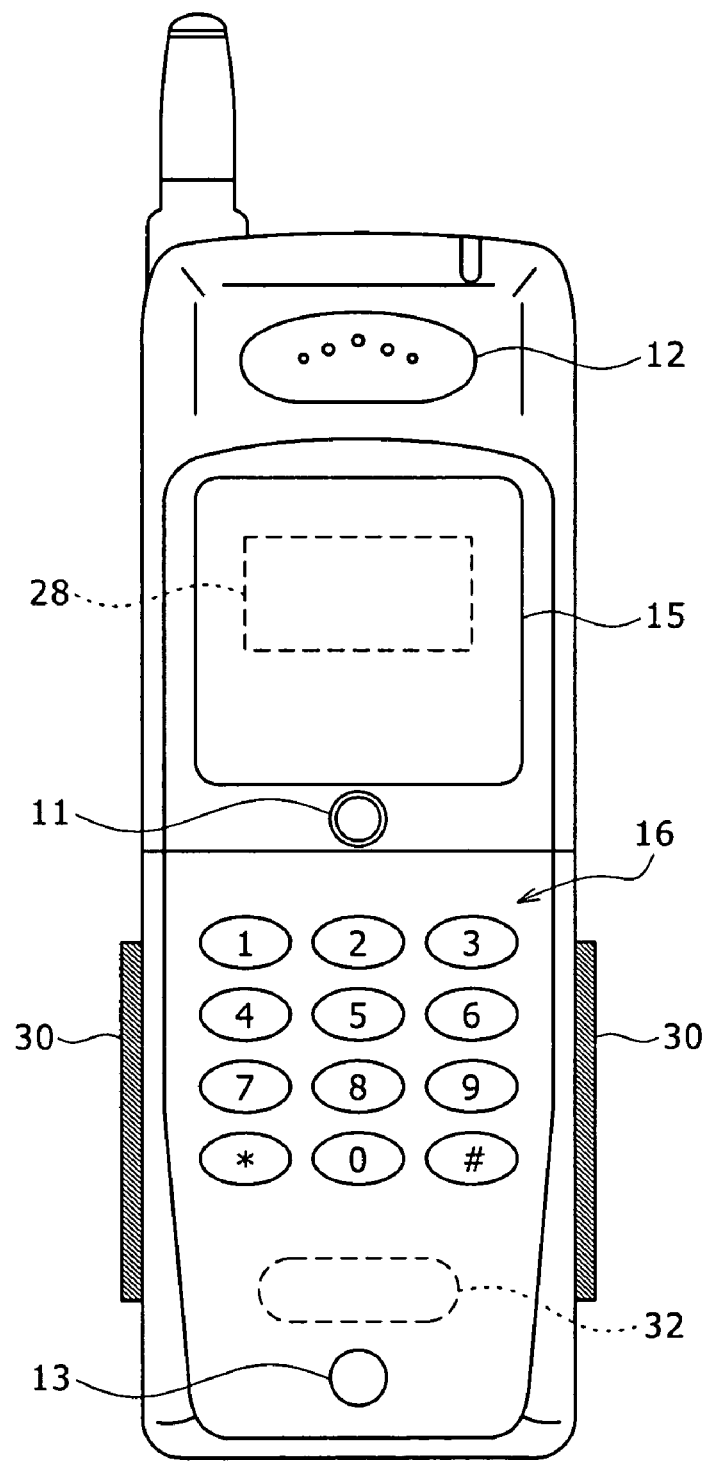
FIG. 4 is an external view of the mobile information and a device installation status thereof.

FIG. 4 shows an external view of the mobile phone 9 and a device installation thereon.

The mobile phone 9 has a loudspeaker 12 one end thereof and the microphone 13 on the other end thereof.

Adjacent to the loudspeaker 12, a display 15 is arranged. In the vicinity of the rear of the display 15, acceleration sensor 28 is incorporated.

Further, adjacent to display 15, an image input block 11 is arranged. Between the image input block 11 and the microphone 13, the key input block 16 is arranged.

In the vicinity of key input block 16, the pressure sensor 30 is arranged on the right and left sides of the mobile phone 9 to detect a pressure caused by the grasping of the mobile phone 9 by the user.

Further, in the vicinity of key input block 16, the vibrator 32 is incorporated in the mobile phone 9; when the vibrator 32 generates vibration, it propagates throughout the mobile phone 9, thereby vibrating the mobile phone 9.

The following describes details of an action information input processing. The mobile phone 9 has the acceleration sensor 28 and the pressure sensor 30 as means of inputting action information.

The action intensity in the case where the user shakes (or grips) the mobile phone 9 to enter action information, namely, whether the user shakes (or grips) the 9 intensely, in a medium manner, or weakly is associated with user's subjectivity in feeling; therefore, it is necessary to create a table in which the intensity information for specifying action intensities and user's subjectivity are related with each other.

Figure 5:
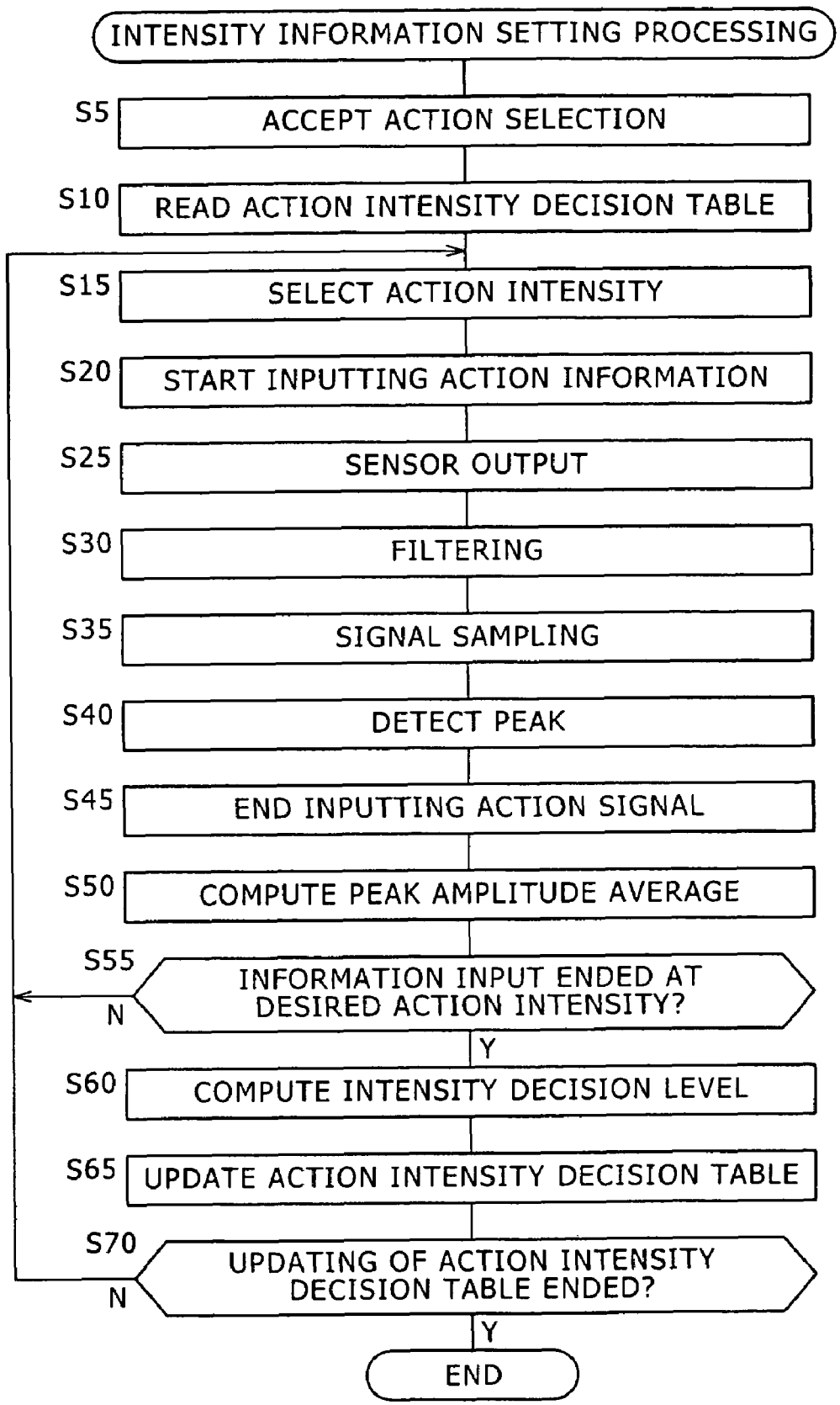
FIG. 5 is a flowchart indicative of intensity information setting processing.

The following describes a procedure of intensity information setting processing with reference to the flowchart shown in FIG. 5.

First, in accordance with instructions shown on the display 15, the user starts up the intensity information setting function on the mobile phone 9.

This function is realized by executing an action transmission program stored in the storage block 20 by the information processing block 18.

The information processing that follows is executed by the CPU of the information processing block 18 in accordance with the action transmission program.

When the intensity information setting function gets started, an intensity information setting screen is shown on the display 15, waiting for the selection of an action by the user (step 5).

Although not shown, the intensity information setting screen allows the selection of "shake" action and "grip" action. Selecting "shake" action generates the action intensity decision table for the acceleration sensor 28. Selecting "grip" action generates the action intensity decision table for the pressure sensor 30.

Next, the information processing block 18 reads the action intensity decision table corresponding to the selection made in step 5 from the storage block 20 (step 10).

The storage block 20 stores the action intensity decision tables for the types of actions; "shake" action intensity decision table and "grip" action intensity decision table, for example. In step 10, the action intensity decision table for the action selected in step 5 is read from the storage block 20 to be updated.

It should be noted that each table to be read in step 10 has been created by the user beforehand or has been stored as default at the purchase of the mobile phone 9 for example.

Next, the information processing block 18 shows options on the display 15 representative of an intensity of the action to be executed. The user selects a desired intensity (step 15).

For example, the display 15 shows "Intense", "Medium", and "Weak"; if the user wants an intense action (shake or grip) according to his subjectivity, the user selects "Intense", if the user wants a medium action, the user selects "Medium", and, if the user wants a weak action, the user selects "Weak".

Next, the information processing block 18 prompts the user to press a predetermined key on the display 15. When the user presses a predetermined key accordingly, the information processing block 18 starts entering an action information (step 20).

Having pressed a predetermined key, the user starts an operation with the operation intensity selected in step 15.

The information processing block 18 starts getting sensor output from the sensor corresponding to the type of action selected by the user; namely, the acceleration sensor 28 if the user has selected "Shake" action or the pressure sensor 30 if the user has selected "Grip" action. Consequently, the inputting of the action information gets started (step 20).

In what follows, the description will be made assuming that "Shake" action has been selected; the same information processing procedure is used if "Grip" action has been selected.

When the user shakes the mobile phone 9, the acceleration sensor 28 outputs an acceleration signal (step 25).

The signal outputted from the acceleration sensor 28 is filtered by a bandpass filter, not shown, (step 30).

This bandpass filter is set to about 0.5 Hz to 5 Hz of pass band. Of the sensor outputs, those in this band range are used for the creation of the action intensity decision table.

For the cutoff frequency on the low-frequency side, a frequency is selected that prevents the direct current component and the low-frequency component from being outputted to provide a signal other than that indicative of the action made by the user. For the cutoff frequency on the high-frequency side, the upper limit of an output device (the vibrator 32) responsible range is selected.

In the present embodiment, the filtering is executed at the stage of analog signal; alternatively, the filtering may be executed on the digital signal obtained by analog-to-digital converting the output signal of the acceleration sensor 28.

Next, the filtered output signal is amplified by the AMP 28a and the amplified signal is sampled in the D/A converter 28b to be converted in a digital signal (step 35).

The resultant digital output signal is transmitted to the action information control block 21 and the information processing block 18 via the bus line 19.

The information processing block 18 detects peaks from this action information and temporarily stores the detected peak values in the RAM or the storage block 20 (step 40).

Then, the information processing block 18 prompts the user to press a predetermined key to end inputting the action information (step 45).

When the user's operation ends, the information processing block 18 computes an amplitude average of the peak values stored in step 40 and stores a computed average (step 50).

Next, the information processing block 18 shows on the display 15 a message such as "Do you want to end setting intensity information?" for example and "Yes" and "No" buttons to let the user select the continuation or the end of intensity information setting (step 55).

For example, if the user has set "Intense" and wants to set another action intensity, the user presses "No" button; if the user has completed the action intensity setting, the user presses "Yes" button.

If the user selects "No" (step 55, N), the information processing block 18 returns to step 15, letting the user to continue to input action intensity information.

If the user has not set the intensity information for all intensities, or if the user has set the intensity information for "Intense" but not for "Medium" and "Weak" for example and selects "Yes", then the values recorded to the action intensity decision table are used for the intensity information not set by the user.

If the user selects "Yes" (step 55, Y), then the information processing block 18 computes an intensity decision level (step 60).

First, the information processing block 18 computes a value obtained by adding the amplitude average for action intensity "Intense" and the amplitude average for action intensity "Medium" and diving the obtained value by two, namely, computes an average value of both intensities, thereby providing level 1.

Likewise, the information processing block 18 computes a value obtained by adding the amplitude average for action intensity "Medium" and the amplitude average for action intensity "Weak" and diving the obtained value by two, thereby providing level 2.

Next, by use of the obtained level 1 and 2 values, the information processing block 18 updates the action intensity decision table (step 65).

Thus, the information processing block 18 has intensity information specification means for allowing the user to specify intensity information about physical quantity variations (acceleration, pressure, and so on).

Then, the information processing block 18 sets a correlation between physical quantity variation and intensity information by use of the magnitude of the detected physical quantity variation and the user-specified intensity information and records this correlation to the action intensity decision table (or intensity information storage means).

Next, the information processing block 18 sets another action intensity decision table (for example, "Grip" action intensity decision table after "Shake" action intensity decision table) or gives the user an enquiry. If the user selects the setting of another action intensity decision table (step 70, N), the information processing block 18 returns to step 15 to repeat the above-mentioned processing for that action intensity decision table. If the user selects the end of the setting (step 70, Y), the above-mentioned processing comes to an end.

FIG. 6 shows a logical configuration of "Shake" action intensity decision table.

As shown, in "Shake" action intensity decision table, level 1 is set to +5.6 V and level 2 is set to +3.2 V.

The acceleration sensor 28 outputs an acceleration signal in voltage, while "Shake" action intensity decision table sets the levels by the output voltage of the acceleration sensor 28.

It should be noted that the maximum output of the acceleration sensor 28 is 7.0 V.

If the user shakes the mobile phone 9, the "Shake" action intensity decision table is used for the information processing block 18 to determine to which of "Intense", "Medium", and "Weak" the intensity of this shake corresponds.

If the output of the acceleration sensor 28 is greater than level 1, the information processing block 18 determines "Intense"; if the output is between level 1 and level 2, the information processing block 18 determines "Middle"; and if the output is smaller than level 2, the information processing block 18 determines "Weak".

FIG. 7 shows a logical configuration of "Grip" action intensity decision table.

As shown, in "Grip" action intensity decision table, level 1 is set to +4.2 V and level 2 is set to +1.4 V.

The maximum output of the pressure sensor 30 is also 7.0 V.

Therefore, if the output of the pressure sensor 30 is greater than level 1, the information processing block 18 determines "Intense"; if the output is between level 1 and level 2, the information processing block 18 determines "Middle"; and if the output is smaller than level 2, the information processing block 18 determines "Weak".

As described above, each of the action intensity decision tables is configured by sensor output voltages; alternatively, the tables may be configured percentages of outputs to maximum outputs. In this case, level 1 is equivalent to 80% and level 2 is equivalent to 40%, for example.

Figure 8:
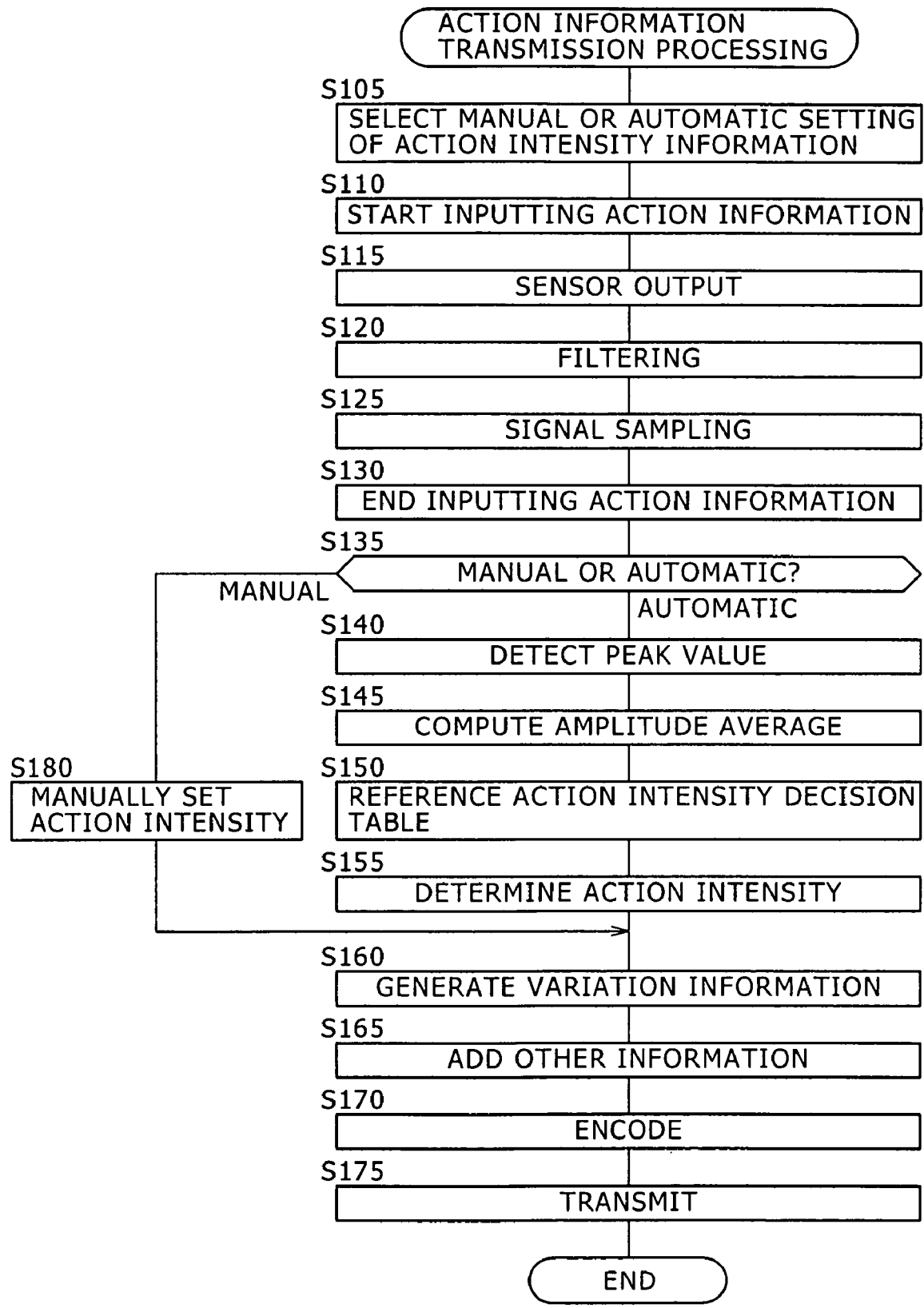
FIG. 8 is a flowchart indicative of a procedure for transmitting action information.

The following describes a procedure for transmitting action information by use of the mobile phone 9 with reference to the flowchart shown in FIG. 8.

First, the user operates a menu screen shown on the display 15, for example, and puts the mobile phone 9 into an action information input mode.

Consequently, an action information input screen, not shown, appears on the display 15.

On the action information input screen, an option for manual or automatic setting of action intensity is displayed, and user selects one of these setting modes (step 105). At this moment, the user also selects the type of action, "Shake" or "Grip", for example.

In the manual setting, the user enters an action and then manually enters "Intense", "Middle", or "Weak". In the automatic setting, the information processing block 18 sets an action intensity by use of the corresponding action intensity decision table.

Next, in accordance with instructions shown on the display 15, the user starts entering the action information by pressing a predetermined key (step 110), acting on the mobile phone 9 with a desired intensity. Consequently, an output signal is generated from the corresponding sensor (the acceleration sensor 28 or the pressure sensor 30) (step 115).

The output signal is filtered by a bandpass filter (step 120) and the filtered signal is sampled by the D/A converter into a digital signal (step 125). The information processing block 18 gets this digital signal and stores the signal into the RAM or the storage block 20.

The information processing block 18 lets the user press a predetermined key to end the operation of entering the action information (step 130).

Next, the information processing block 18 determines whether the user has selected the manual setting or the automatic setting in step 105 (step S135).

If the manual setting is found selected (step 135, Manual), the information processing block 18 shows "Intense", "Medium", and "Weak" on the display 15 and lets the user select one (step 180).

Then, the information processing block 18 goes to step 160, which will be described later.

On the other hand, if the automatic setting is found selected (step 135, Automatic), the information processing block 18 detects peaks of the action information (step 140) and averages the detected peak values to get an amplitude average (step 145).

Then, the information processing block 18 references the action intensity decision table corresponding to the type of the action made by the user (step 150), thereby determining an action intensity from the relationship in magnitude between the levels in the action intensity decision table and the computed amplitude average (step 155).

As described above, the information processing block 18 has intensity information acquisition means for acquiring intensity information by use of the intensity information storage means (or the action intensity decision tables).

If the amplitude average is greater than level 1, the information processing block 18 determines "Intense"; if the amplitude average is between level 1 and level 2, the information processing block 18 determines "Medium"; and if the amplitude average is smaller than level 2, the information processing block 18 determines "Weak".

For example, if the user shakes the mobile phone 9 and the average amplitude of the output of the acceleration sensor 28 is 4 V, then the action intensity is "Medium" from the action intensity decision table shown in FIG. 6.

Next, the information processing block 18 standardizes the action information inputted by the user and stored, thereby generating variation information (step 160).

This standardization processing may be executed by use of the maximum value of sensor output as a standard reference value and dividing a measurement obtained from the sensor by the maximum value of sensor output.

Consequently, the information obtained by standardizing the temporal variation of the physical variation due to user's action by amplitude may be generated.

As described above, the information processing block 18 has variation information generation means for generating variation information by standardizing detected physical quantity variation (or action information).

Action information is time-dependent information describing the magnitude of a predetermined physical quantity (acceleration or pressure for example) and its temporal variation. Resolving this action information into action intensity and variation information allows the separation of the action intensity of which impression heavily depends on user's subjectivity. This action intensity is processed separately from the action variation.

Further, the information processing block 18 may enter other forms of information, such as text, image, and voice, for example, as desired by the user.

Then, the information processing block 18 attaches these pieces of input information to the intensity information and the variation information (step 165). At the same time, the information processing block 18 attaches the tag information shown in FIG. 3 to these pieces of information.

Next, the information processing block 18 encodes these pieces of information (step 170) and transmits the encoded information to the mobile phone of the opposite party (step 175).

Thus, a combination of intensity information and standardized sensor output time-dependent information may be transmitted to the mobile phone of the opposite party.

The following describes the reproduction of the action information (intensity information and variation information) received from the mobile phone of the opposite party.

The mobile phone 9 outputs the information about physical quantity variation received from the mobile phone of the opposite party, namely, the action information, as a physical variation that the user may recognize by user's tactile sensibility.

In this example, the mobile phone 9 outputs the action information transmitted by vibrating the mobile phone 9 with the vibrator 32 (FIG. 2).

It should be noted that, in sensing the vibration of the mobile phone 9, whether the user feels the vibration intense, weak, or medium depends on user's subjectivity.

Therefore, it is necessary to store beforehand the information about intense, medium, and weak vibrations as felt by the user into the mobile phone 9.

Figure 9:
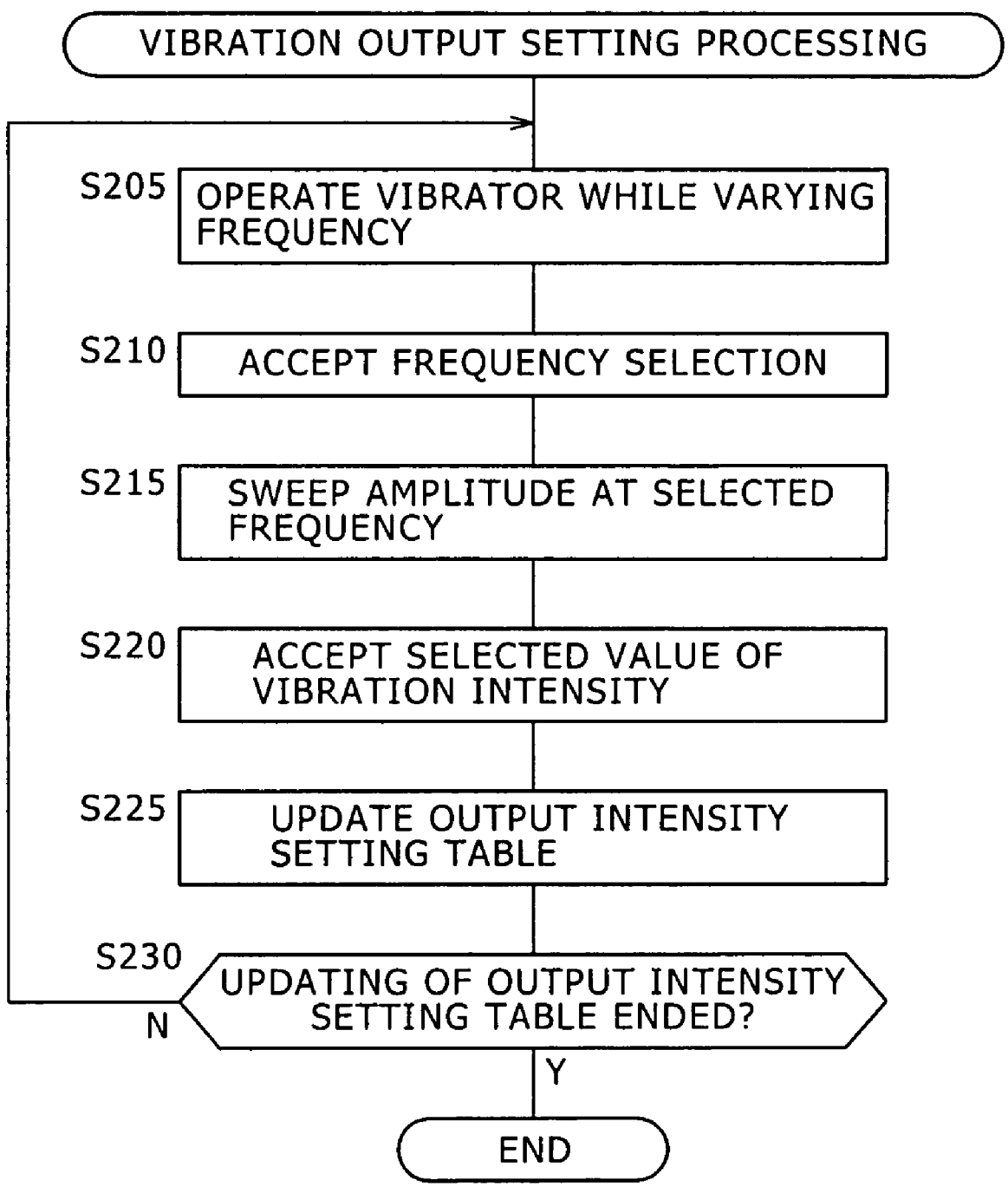
FIG. 9 is a flowchart indicative of vibration output setting processing.

The following describes a procedure for vibration output setting processing with reference to the flowchart shown in FIG. 9.

This processing creates an output intensity setting table for correlating the reference vibration output to be outputted to the mobile phone 9 with the subjectivity about the vibration output. It should be noted that the output intensity setting table constitutes amplification factor storage means.

First, the user operates a menu screen shown on the display 15 and starts an output intensity setting table setting function.

Then, the information processing block 18 reads the output intensity setting table from the storage block 20. This table is one that was created by the user before or provided as default.

Next, the information processing block 18 outputs sequentially drive signals having a same amplitude at frequencies (or vibratory frequencies) 1 to 50 Hz (in units of 1 Hz) to drive the vibrator 32 for vibration (step 205).

Holding the mobile phone 9, the user feels the outputted vibration and selects the frequency at which the vibration is most intense (the frequency of highest sensitivity). The information processing block 18 accepts this selection (step 210).

This processing may be executed by showing message "Press number 9 when you feel the vibration most intense" for example on the display 15 and accepting the frequency at which the user has pressed number 9 on the key input block 16.

Thus, the information processing block 18 has a frequency specification means for letting the user specify the frequency of the vibrator 32 at specification of intensity information.

Next, the information processing block 18 outputs a drive signal of selected frequency fs in an amplitude sweep manner, thereby executing amplitude output (step 215).

The amplitude is gradually increased while keeping the vibratory frequency of the vibrator 32 at constant level of fs.

Holding the mobile phone 9, the user feels the outputted vibration and, when the user feels "Weak", "Medium", and "Intense" vibrations according to user's subjectivity, these pieces of information is transmitted to the information processing block 18. The information processing block 18 then makes confirmation of the output of the vibrator 32.

The user may execute this processing by pressing a predetermined key on the key input block 16 in accordance with instructions shown on the display 15, while feeling the vibration of the mobile phone 9.

Consequently, the information processing block 18 accepts the selection of vibration intensity (the output of the vibrator 32) (step 220).

The information processing block 18 updates the output intensity setting table by use of the amplitude (the input voltage to the vibrator 32) at the time of selection by the user (step 225).

Next, the information processing block 18 prompts the user whether or not to end the updating the output intensity setting table by showing a message on the display 15 for example (step 230). If the user selects the end of updating (step 230, Y), the information processing block 18 ends the vibration output setting processing.

On the other hand, if the user does not select the end of updating (step 230, N), the information processing block 18 returns to step 205 to repeat the above-mentioned vibration output setting processing.

As described above, the information processing block 18 has intensity information specification means, amplification factor setting means, and updating means. Intensity information specification means let the user specify intensity information for an outputted physical variation (the vibration of the vibrator 32). Amplification factor setting means sets the correlation between intensity information and amplification factor by use of the output value of physical variation (vibration) at the time of the specification. Updating means updates the correlation between intensity information and amplification factor stored in the amplification factor storage means (the output intensity setting table).

Figures 10, 11:
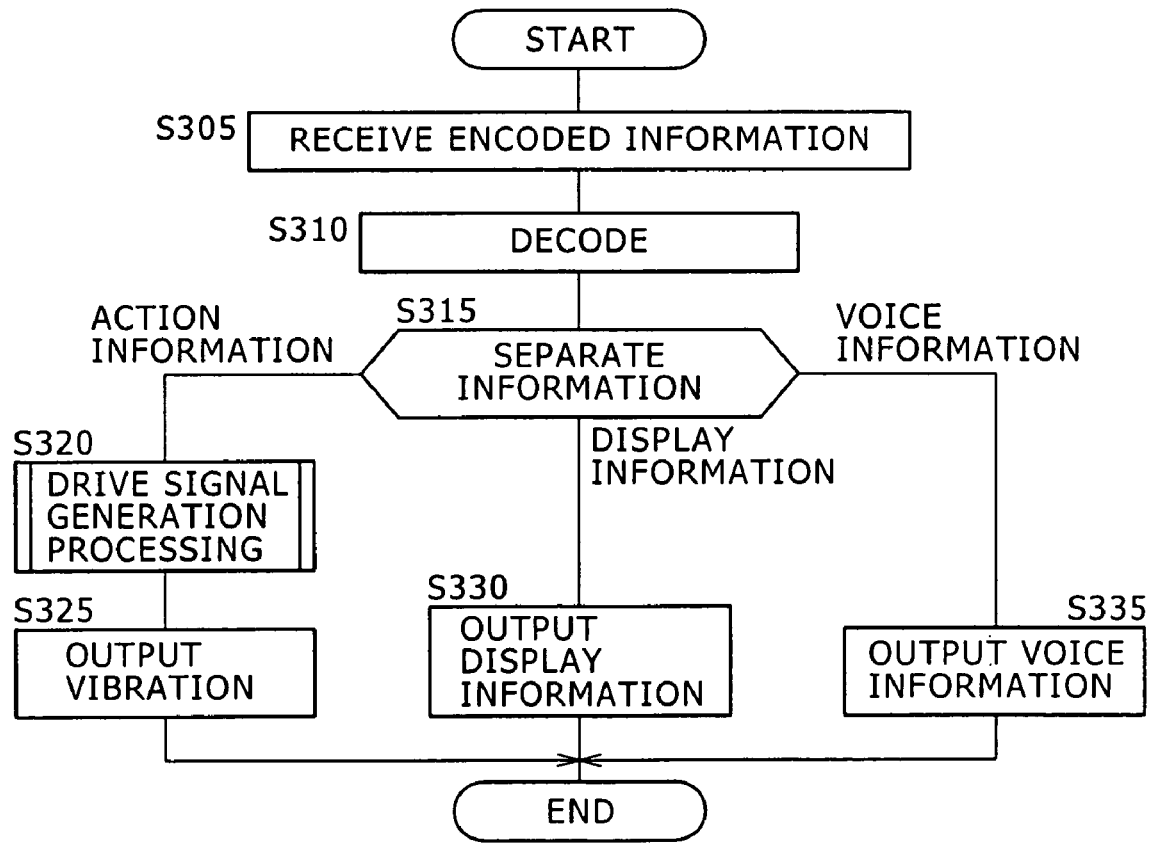
FIG. 10 is a diagram illustrating an exemplary logical configuration of an output intensity setting table.
FIG. 11 is a flowchart indicative of a procedure for reproducing action information.

FIG. 10 shows one example of the logical configuration of the output intensity setting table created as described above.

In this output intensity setting table, amplification factor, namely gain, is related with intensity information.

In the example shown in FIG. 10, if intensity information is "Intense", amplification factor is 4.8; if intensity information is "Medium", amplification factor is 2.5; and if intensity information is "Weak", amplification factor is 1.8.

This example has been created as described above because, when the user selected "Intense" in the vibration output setting processing, the drive voltage of the vibrator 32 is 4.8 V; when the user selected "Medium", the drive voltage is 2.5 V; and when the user selected "Weak", the drive voltage is 1.8 V.

Because the variation information received from the mobile phone of the opposite party is standardized, the drive voltages at user's selection of "Intense", "Middle" and "Weak" may be used as amplification factors without change.

If the opposite party amplifies the variation information specified with intensity information "Medium" by an amplification factor specified in "Medium" in this output intensity setting table, the vibrator 32 may be vibrated at the frequency at which the user feels "Medium".

The following describes the reproduction of the action information received from the opposite party by use of the output intensity setting table thus obtained, with reference to the flowchart shown in FIG. 11.

First, the information processing block 18 receives encoded information from the mobile phone of the opposite party (step 305) and decodes the received information (step 310).

The decoded information may have information other than action information, so that the information processing block 18 separates the decoded information into action information, display information, and voice information by use of tag information (step 315).

Next, the information processing block 18 reproduces text, symbol, and image to show on the display 15 for the display information (step 315, display information) (step 330). For the voice information, the information processing block 18 reproduces voice and sound to output from the loudspeaker 12 (step 315, voice information) (step 335).

For the action information (step 315, action information), the information processing block 18 uses this information to generate a drive signal for vibrating the vibrator 32 (step 320). The information processing block 18 outputs the generated drive signal to the vibrator 32 to vibrate the same, eventually vibrating the mobile phone 9 (step 325).

Figure 12:
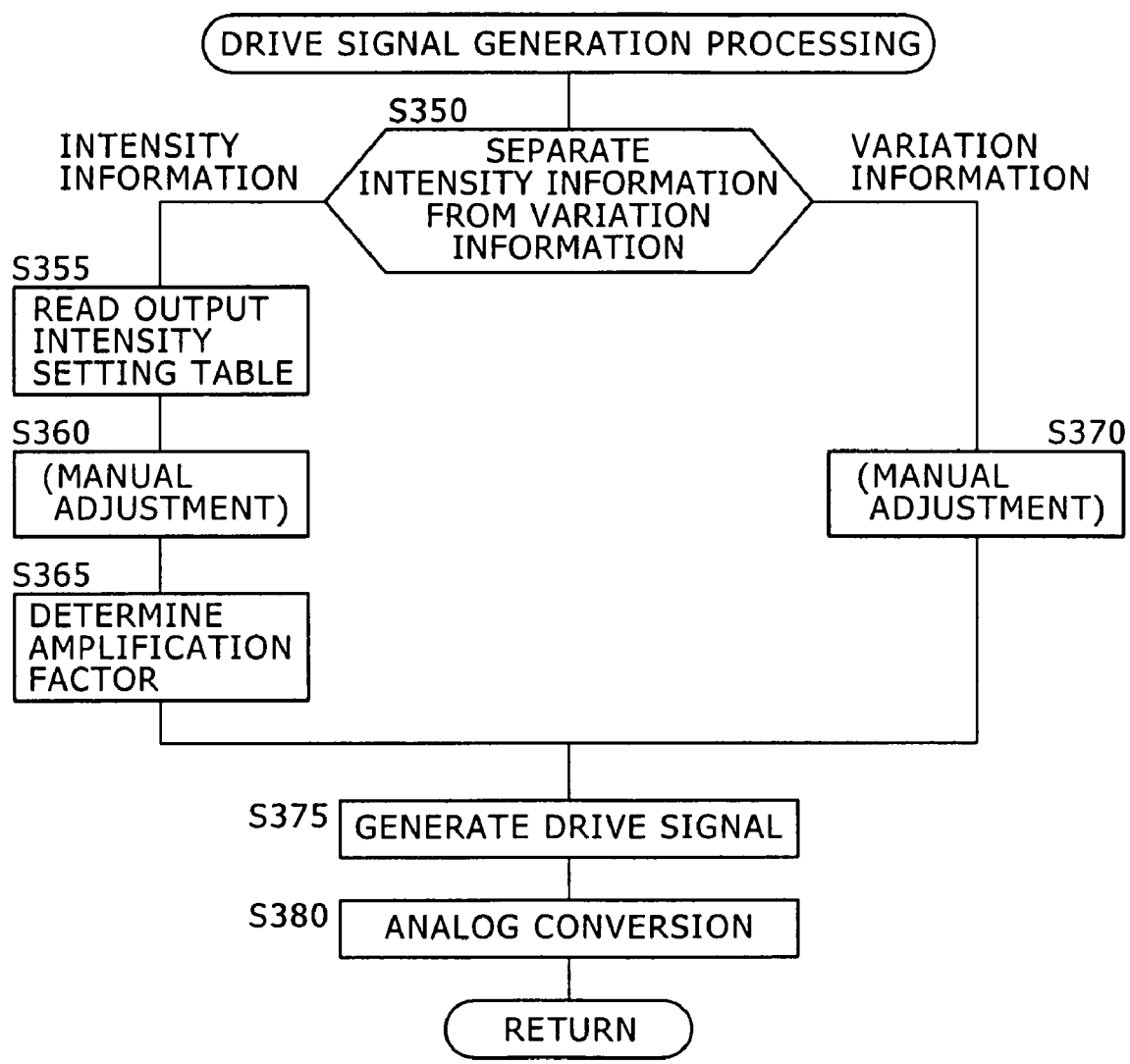
FIG. 12 is a flowchart indicative of drive signal generation processing.

The following describes drive signal generation processing with reference to the flowchart shown in FIG. 12.

First, the information processing block 18 separates action information into intensity information and variation information (step 350).

For intensity information (step 350, intensity information), the information processing block 18 reads the output intensity setting table (step 355) to determine the amplification factor of corresponding intensity information (step 365).

If the user wants the adjustment of amplification factor at this moment, the user presses a predetermined key for example to manually adjust amplification factors specified in a main setting table (step 360).

As for variation information, after user's manual adjustment of frequency (manual clock adjustment) as required (step 370), the information processing block 18 amplifies the variation information by an amplification factor determined in step 365 to generate a drive signal (step 375).

The drive signal generated by the information processing block 18 is converted by the D/A converter 32a (FIG. 2) into an analog signal (step 380) and this analog signal is outputted to the vibrator 32 through the AMP 32a.

As described above, the information processing block 18 has amplification factor acquisition means, output information generation means, and output means. Amplification factor acquisition means acquires amplification factor by use of the amplification factor storage means (the output intensity setting table). Output information generation means generates output information (a drive signal) by amplifying the variation information by acquired amplification factor. Output means outputs a generated output signal as a predetermined physical quantity (for vibrating the vibrator 32).

Figure 13:
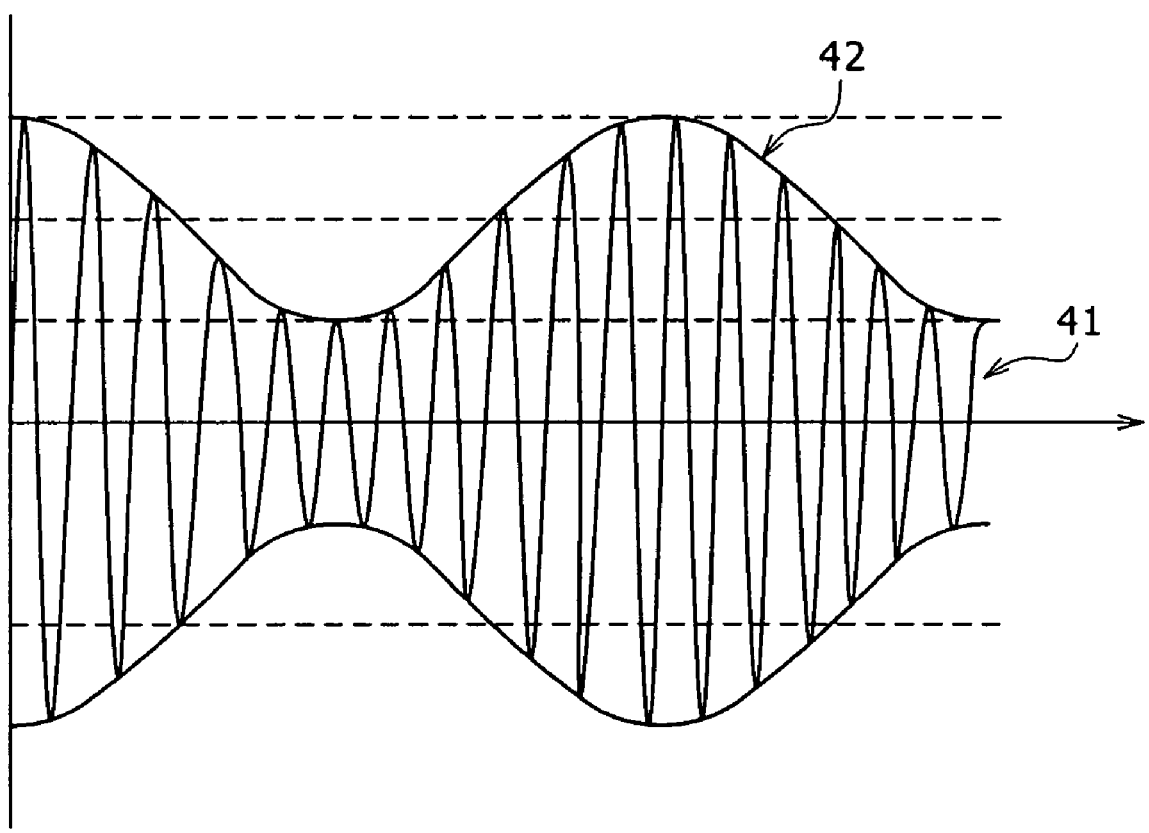
FIG. 13 is a diagram illustrating one method of driving a vibrator.

It should be noted that, rather than driving the vibrator 32 by the waveform obtained by amplifying variation information, the vibration of the vibrator 32 may be outputted as a new drive signal that is obtained by modulating a basic vibration 41 shown in FIG. 13 by a drive signal (reproduced action information).

In this case, the vibrator 32 is vibrated at the frequency of the basic vibration 41 and its amplitude is varied in accordance with the drive signal, which allows the user to feel the action information as an envelope 42.

This method is effective when reproducing low-frequency vibrations that are hard to be reproduced by the vibrator 32.

The above-mentioned embodiment of the invention brings about the following advantages.

(1) The sender party is able to transmit the action information corresponding to the subjectivity of the sender party. The receiver party is able to reproduce the intensity of action intended by the sender party with a magnitude defined in a subjective manner. This novel configuration prevents a misunderstanding based on a subjective difference in sensibility such as touch, thereby realizing smooth communication.

(2) The mobile phone according to the present embodiment is capable of separating action information into standardized variation information and intensity information depending on user subjectivity and transmitting a combination of variation information and intensity information to the mobile phone of the opposite party.

(3) The novel configuration is capable of relating the intensity at entering action information with intensity information by use of an action intensity decision table. Therefore, the intensity of action subjectively entered by the user by use of the action intensity decision table may be automatically determined.

(4) The novel configuration is capable of relating the output intensity at outputting action information with intensity information by use of an output intensity setting table. Therefore, action information may be outputted with an intensity at which the user subjectively feels intensity specified in the intensity information by use of the output intensity setting table.

(5) The novel configuration is capable of relating the subjectivity and intention of action information inputting person with action information characteristic, executing information transmission by combining the subjectivity of action information inputting person and action information that are obtained from action information characteristic at entering action information, and outputting tactile sensibility information by relating it with the subjectivity associated with the tactile sensibility of information receiver person.

Also, the present embodiment is capable of providing an information processing apparatus (or a terminal apparatus) that follows.

An information processing apparatus has an action information input block for inputting information about human action and a tactile sensibility information output block for outputting information as tactile sensibility information. The subjectivity of action information inputting person is related with action information characteristic. Information transmission is executed by combining subjectivity of action information inputting person and action information that are obtained from action information characteristic at entering action information. Tactile sensibility information is outputted by relating it with the subjectivity of the tactile sensibility of information receiver person. For the action information input block, an acceleration sensor may be used. Also, for the action information input block, a pressure sensor may be used. For the tactile sensibility information output block, a vibrator may be used.

In an embodiment of the present embodiment, the mobile phone 9 is used as one example of the terminal apparatus; it is also practicable to use a desktop personal computer, for example.

If a desktop personal computer is used for the terminal apparatus, an externally attached device incorporating the acceleration sensor 28, the pressure sensor 30, and the vibrator 32 for example may be prepared to be connected to the personal computer.

It is also practicable to distribute the action transmission program as stored in computer-readable storage media such as magnetic disk, and CD (Compact Disc), DVD (Digital Versatile Disc), for example.

It should be understood that various changes and modifications to the presently preferred embodiments described herein will be apparent to those skilled in the art. Such changes and modifications can be made without departing from the spirit and scope of the present invention and without diminishing its intended advantages. It is therefore intended that such changes and modifications be covered by the appended claims.

The invention is claimed as follows:

1. An action transmission system comprising:
 a first terminal apparatus including:
  at least one processor;
  at least one input device;
  at least one display device; and
  at least one memory device which stores a plurality of instructions, which when executed by the at least one processor, cause the at least one processor to operate with the at least one display device and the at least one input device to:
  (a) display a first option representative of a first intensity of an action;
  (b) display a second option representative of a second intensity of said action;
  (c) after a first selection of said displayed first option:
   (i) detect a first physical variation applied by a first user, said first physical variation having a first magnitude; and
   (ii) record said first magnitude as first intensity information;
  (d) after a second selection of said displayed second option:
   (i) detect a second physical variation applied by the first user, said second physical variation having a second magnitude; and
   (ii) record said second magnitude as second intensity information;
  (e) in response to a third physical variation applied by said first user, transmit, to a second terminal apparatus:
   (i) first variation information indicative of a first variation in physical quantity; and
   (ii) said recorded first intensity information;
  (f) in response to a fourth physical variation applied by said first user, transmit, to the second terminal apparatus:
   (i) second variation information indicative of a first variation in physical quantity; and
   (ii) said recorded second intensity information;
 said second terminal apparatus:
  (a) receives said variation information and said intensity information from said first terminal apparatus;
  (b) amplifies said received variation information by an amplification factor subjectively set by said second user to correspond to said received intensity information; and
  (c) outputs the amplified variation information as a physical variation.

2. A terminal apparatus comprising:
 at least one processor;
 at least one input device;
 at least one display device; and
 at least one memory device which stores a plurality of instructions, which when executed by the at least one processor, cause the at least one processor to operate with the at least one display device and the at least one input device to:
 (a) display a first option representative of a first intensity of an action;
 (b) display a second option representative of a second intensity of said action;
 (c) after a first selection of said displayed first option:
  (i) detect a first physical variation applied by a user, said first physical variation having a first magnitude; and
  (ii) record said first magnitude as first intensity information;
 (d) after a second selection of said displayed second option:
  (i) detect a second physical variation applied by the user, said second physical variation having a second magnitude; and
  (ii) record said second magnitude as second intensity information;
 (e) detect a predetermined variation in physical quantity caused by an action applied by first user;
 (f) acquire intensity information subjectively set by said first user to correspond to a magnitude of said detected variation in physical quantity; and
 (g) transmit variation information indicative of said detected variation in physical quantity and said acquired intensity information.

3. The terminal apparatus of claim 2, wherein when executed by the at least one processor, the instructions cause the at least one processor to generate variation information by standardizing said detected variation in physical quantity, wherein said generated variation information is transmitted.

4. The terminal apparatus of claim 2, wherein when executed by the at least one processor, the instructions cause the at least one processor to:
(a) specify intensity information for the variation of detected physical quantity; and
(b) store a correlation between a magnitude of variation in physical quantity and intensity information by use of a magnitude of said detected variation in physical quantity and said specified intensity information, wherein intensity information by use of said correlation is acciuired.

5. The terminal apparatus of claim 2, wherein when executed by the at least one processor, the instructions cause the at least one processor to:
(a) receive variation information indicative of a variation in physical quantity based on an action applied by a second user to a second terminal apparatus and intensity information corresponding to a magnitude of said variation in physical quantity from said second terminal apparatus;
(b) store a correlation, subjectively set by said first user, between intensity information and an amplification factor;
(c) acquire an amplification factor corresponding to said received intensity information;
(d) generate output information by amplifying said received variation information by said acquired amplification factor; and
(e) output said generated output information as a predetermined physical variation.

6. The terminal apparatus of claim 5, wherein when executed by the at least one processor, the instructions cause the at least one processor to:
(a) specify intensity information by said first user for a predetermined physical variation outputted from said output means;
(b) set a correlation between intensity information and amplification factor by use of an output value indicative of the physical variation outputted at specification of said intensity information; and
(c) update a correlation between intensity information and amplification factor by use of said set correlation between intensity information and amplification factor.

7. The terminal apparatus of claim 6, wherein:
said output means is a vibrator for outputting a physical variation as vibration; and
when executed by the at least one processor, the instructions cause the at least one processor to specify, by said first user, a frequency of said vibrator at specifying intensity information by said first user.

8. The terminal apparatus of claim 5, wherein said output means is a vibrator for outputting a physical variation as vibration, said vibrator outputting a basic vibration having a constant frequency by executing amplification modulation by use of said generated output information.

9. A terminal apparatus, operated by a first user, comprising:
at least one processor;
at least one input device;
at least one display device; and
at least one memory device which stores a plurality of instructions, which when executed by the at least one processor, cause the at least one processor to operate with the at least one display device and the at least one input device to:
(a) receive a first input from a first user corresponding to a first selection of a first drive signal;
(b) in response to said received first input, store a first correlation between first intensity information and a first amplification factor;
(c) receive a second input from the first user corresponding to a second selection of a second drive signal;
(d) in response to said received second input, store a second correlation between second intensity information and a second amplification factor;
(e) receive:
(i) variation information indicative of a variation in physical quantity based on an action applied by a second user to a second terminal apparatus; and
(ii) intensity information corresponding to a magnitude of said variation in physical quantity from said second terminal apparatus;
(f) acquire at least one of said first amplification factor and said second amplification factor, said acquired amplification factor corresponding to said received intensity information
(g) generate output information by amplifying said received variation information by said acquired amplification factor; and
(h) output said generated output information as a predetermined physical variation.

10. The terminal apparatus of to claim 9, when executed by the at least one processor, the instructions cause the at least one processor to:
(a) specify intensity information by said first user for a predetermined physical variation outputted from said output means;
(b) set a correlation between intensity information and amplification factor by use of an output value indicative of the physical variation outputted at specification of said intensity information; and
(c) update a correlation between intensity information and the stored amplification factor by use of said set correlation between intensity information and amplification factor.

11. The terminal apparatus of claim 10, which includes a vibrator for outputting a physical variation as vibration, when executed by the at least one processor, the instructions cause the at least one processor to specify, by said first user, a frequency of said vibrator at specifying intensity information by said first user.

12. The terminal apparatus of claim 9, which includes a vibrator for outputting a physical variation as vibration, said vibrator outputting a basic vibration having a constant frequency by executing amplification modulation by use of said generated output information.

13. An action transmission method for a computer having action detection step, intensity information acquisition step, and transmission step, the action transmission method comprising:
causing a display device to display a first option representative of a first intensity of an action;
causing a display device to display a second option representative of a second intensity of said action;
after a first selection of said displayed first option:
(i) detecting a first physical variation applied by a first user, said first physical variation having a first magnitude; and
(ii) recording said first magnitude as first intensity information;
after a second selection of said displayed second option:
(i) detecting a second physical variation applied by the first user, said second physical variation having a second magnitude; and (ii) recording said second magnitude as second intensity information;

detecting a predetermined variation in physical quantity caused by an action applied by the first user;

acquiring intensity information corresponding to a magnitude of said detected variation in physical quantity subjectively set by a user; and transmitting variation information indicative of said detected variation in physical quantity and said acquired intensity information.

14. An action transmission method for a computer having reception step, amplification factor storage step storing correlation between intensity information and amplification factor subjectively set by a user, amplification factor acquisition step, output information generation step, and output step, the action transmission method comprising:

receiving a first input from a first user corresponding to a first selection of a first drive signal;

in response to said received first input, storing a first correlation between first intensity information and a first amplification factor;

receiving a second input from the first user corresponding to a second selection of a second drive signal;

in response to said received second input, storing a second correlation between second intensity information and a second amplification factor;

receiving:
  (i) variation information indicative of a variation in physical quantity based on an action applied by a second user to a second terminal apparatus; and
  (ii) intensity information corresponding to a magnitude of said variation in physical quantity from said second terminal apparatus;

acquiring at least one of said first amplification factor and said second amplification factor, said acqired amplification factor corresponding to said received intensity information;

generating output information by amplifying said received variation information by said acquired amplification factor; and output step for outputting said generated output information as a predetermined physical variation.

15. A computer program product embodied in a computer readable medium storing a program for transmitting action information, said program comprising the steps of:

causing a display device to display a first option representative of a first intensity of an action;

causing a display device to display a second option representative of a second intensity of said action;

after a first selection of said displayed first option:
  (i) detecting a first physical variation applied by a first user, said first physical variation having a first magnitude; and
  (ii) recording said first magnitude as first intensity information;

after a second selection of said displayed second option:
  (i) detecting a second physical variation applied by the first user, said second physical variation having a second magnitude; and
  (ii) recording said second magnitude as second intensity information;

detecting a predetermined variation in physical quantity caused by an action applied by the first user;

acquiring intensity information corresponding to a magnitude of said detected variation in physical quantity subjectively set by a user; and transmitting variation information indicative of said detected variation in physical quantity and said acquired intensity information.

16. A computer program product embodied in a computer readable medium storing a program for transmitting action information, said program comprising the steps of:

receiving a first input from a first user corresponding to a first selection of a first drive signal;

in response to said received first input, storing a first correlation between first intensity information and a first amplification factor;

receiving a second input from the first user corresponding to a second selection of a second drive signal;

in response to said received second input, storing a second correlation between second intensity information and a second amplification factor;

receiving:
  (i) variation information indicative of a variation in physical quantity based on an action applied by a second user to a second terminal apparatus; and
  (ii) intensity information corresponding to a magnitude of said variation in physical quantity from said second terminal apparatus;

acquiring at least one of said first amplification factor and said second amplification factor, said acquired amplification factor corresponding to said received intensity information;

generating output information by amplifying said received variation information by said acquired amplification factor; and outputting said generated output information as a predetermined physical variation.

17. A terminal apparatus comprising:

at least one processor;

at least one input device;

at least one display device; and at least one memory device which stores a plurality of instructions, which when executed by the at least one processor, cause the at least one processor to operate with the at least one display device and the at least one input device to:

(a) display a first option representative of a first intensity of an action;

(b) display a second option representative of a second intensity of said action;

(c) after a first selection of said displayed first option:
  (i) detect a first physical variation applied by a user, said first physical variation having a first magnitude; and
  (ii) record said first magnitude as first intensity information;

(d) after a second selection of said displayed second option:
  (i) detect a second physical variation applied by the user, said second physical variation having a second magnitude; and
  (ii) record said second magnitude as second intensity information;

(e) detect a predetermined variation in physical quantity caused by an action applied by the user;

(f) acquire an intensity information acquisition section for acquiring intensity information corresponding to a magnitude of said detected variation in physical quantity subjectively set by said user; and (g) transmit variation information indicative of said detected variation in physical quantity and said acquired intensity information.

* * * * *